United States Patent
Galkowski et al.

(10) Patent No.: US 6,259,988 B1
(45) Date of Patent: Jul. 10, 2001

(54) REAL-TIME MISSION ADAPTABLE ROUTE PLANNER

(75) Inventors: Peggy J. Galkowski, Endicott; Ira S. Glickstein, Apalachin; Peter N. Stiles, Owego; Robert J. Szczerba, Endicott, all of NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/118,838

(22) Filed: Jul. 20, 1998

(51) Int. Cl.⁷ .............................. G06F 19/00; G01C 21/00
(52) U.S. Cl. .......................... 701/202; 701/201; 701/202; 701/210; 705/400; 705/417; 705/418; 340/989; 340/995
(58) Field of Search ..................... 701/202, 23, 200; 705/400; 340/989; 345/428

(56) References Cited

U.S. PATENT DOCUMENTS

| | | | |
|---|---|---|---|
| 4,413,316 | 11/1983 | Blue et al. | 701/202 |
| 4,812,990 | 3/1989 | Adams et al. | 701/201 |
| 4,862,373 | 8/1989 | Meng | 701/202 |
| 4,926,336 | 5/1990 | Yamada | 701/201 |
| 4,962,458 | 10/1990 | Verstraete . | |
| 4,999,782 | 3/1991 | BeVan | 701/206 |
| 5,170,353 | 12/1992 | Verstraete | 701/201 |
| 5,340,061 | 8/1994 | Vaquier et al. | 244/175 |
| 5,408,413 | 4/1995 | Gonser et al. | 701/204 |
| 5,459,666 | 10/1995 | Casper et al. | 701/123 |
| 5,504,686 | 4/1996 | Lippitt et al. | 701/201 |
| 5,548,773 | 8/1996 | Kemeny et al. | 395/800 |
| 5,936,631 | * 8/1999 | Yano et al. | 345/428 |
| 6,016,485 | * 1/2000 | Amakawa et al. | 705/400 |
| 6,026,384 | * 2/2000 | Poppen | 705/400 |
| 6,038,559 | * 3/2000 | Ashby et al. | 707/4 |

* cited by examiner

Primary Examiner—William A. Cuchlinski, Jr.
Assistant Examiner—Tuan C To
(74) Attorney, Agent, or Firm—McGuireWoods, LLP

(57) ABSTRACT

A hybrid of grid-based and graph-based search computations, together with provision of a sparse search technique effectively limited to high-probability candidate nodes provides accommodation of path constraints in an optimization search problem in substantially real-time with limited computational resources and memory. A grid of best cost (BC) values are computed from a grid of map cost (MC) values and used to evaluate nodes included in the search. Minimum segment/vector length, maximum turn angle, and maximum path length along a search path are used to limit the number of search vectors generated in the sparse search. A min-heap is preferably used as a comparison engine to compare cost values of a plurality of nodes to accumulate candidate nodes for expansion and determine which node at the terminus of a partial search path provides the greatest likelihood of being included in a near-optimal complete solution, allowing the search to effectively jump between branches to carry out further expansion of a node without retracing portions of the search path. Capacity of the comparison engine can be limited in the interest of expediting of processing and values may be excluded or discarded therefrom. Other constraints such as approach trajectory are accommodated by altering MC and BC values in a pattern or in accordance with a function of a parameter such as altitude or by testing of the search path previously traversed.

5 Claims, 11 Drawing Sheets

REAL-TIME MISSION ADAPTABLE ROUTE PLANNER

This invention was made with Government support under contract DAAJ02-93-C-0008 awarded by the U.S. Army. The Government has certain rights in this invention.

BACKGROUND OF THE INVENTION

1. Field of the Invention

The present invention generally relates to navigation and planning optimization systems and, more particularly, to route planning for travel paths subject to a variety of navigational constraints.

2. Description of the Prior Art

When a course of travel is not constrained by roads or other fixed structures, such as during travel by air or water or over unimproved land, careful navigation along a path extending from a starting point to a goal is required. The choice of a path may, in such a case, be constrained by many factors such as range or other physical limitations of a vehicle, weather conditions and other conditions which may compromise safety, and human factors, such as operator (e.g. pilot) workload. Some fixed structures may also affect the choice of path such as the orientation of a runway, the physical layout of harbors, docks and the like as well as physical obstacles which may be man-made or natural.

In the past, a trained navigator (generally a pilot, driver or ship officer, sometimes referred to collectively hereinafter as simply "pilot") would choose a path or course based on the best available information concerning as many of the above matters as possible. However, in practice, often information would be available concerning only a few of the above matters. While greater availability of information has improved safety and efficiency of route choice, even highly trained navigators are unable to assimilate the amount of information which may be available or to assign an appropriate degree of importance to each item of information and are thus able to perform only the most rudimentary of quantitative optimization of route details. Further, planning by a navigator including responses to changes of conditions or circumstances is always subject to human error; the likelihood of which increases with the amount of information available for consideration.

Additionally, in recent years, many more types of information and constraints have been included in route planning which further complicates the route planning process for a human navigator. Such constraints may include, but are not limited to, minimum leg length (e.g. a minimum interval in time or distance between changes of course) and maximum turning angle (e.g. a limit of the vehicle or an angle at which likelihood of collision is not significantly increased when plural vehicles are traversing the route in close proximity to one another). Accordingly, attempts have been made to use automated data processing to plan travel routes.

Known route planning or optimization techniques generally follow one of two distinct methodologies: grid-based techniques and graph-based techniques. Each of these categories has its own distinct advantages and disadvantages.

Grid-based techniques are generally directed to optimization to the level of grid cell resolution employed and can generally converge to a relatively accurate solution in real time. However, grid-based techniques can accommodate quantitative metrics and limits and particular constraints only with difficulty and a solution complying therewith may not be found. Further, discontinuities in the search space may not allow some solutions to be reliably found, particularly an alternate solution which may be preferable to an optimum solution but which may be altered therefrom to a seemingly slight degree.

Graph-based techniques are generally very accurate and can generally accommodate metrics and constraints but often suffer from long convergence times, if they converge to a solution at all, since they carry out an exhaustive search of the search space while concurrently applying constraints. Therefore, graph-based techniques require large computing resources if they are to support even the possibility that a solution may be found within a practical amount of time. On the other hand, even large computing resources cannot guarantee that a solution will be found within an acceptable amount of time. Moreover, the possibility of changing circumstances effectively reduces the acceptable time period for finding a solution to a travel problem.

Additionally, the mode of transportation may greatly affect the detail of the planning as well as the relative importance of circumstances in development of a route plan. For example, speed of a vehicle may determine the level of relevant detail and the minimum time or distance between turns. The nature of the mission and the number of vehicles involved as well as speed and maneuverability thereof may affect the maximum allowed turn angle, and so forth.

Accordingly, it has been determined by the inventors that a need has existed for an automated system for travel route planning which could be easily customized to the constraints imposed by the vehicle and other circumstances to produce, in real-time, a route which is as good or better than could be produced by a trained navigator.

SUMMARY OF THE INVENTION

It is therefore an object of the present invention to provide a system and methodology for providing real-time solutions to travel route problems which account for an arbitrary number of constraints of varying importance and other problems involving a sequence of changing conditions or constraints.

It is another object of the invention to provide a methodology for reduction of the search space for graph based optimization problems such as route planning.

It is a further object of the invention to provide a system and method for providing a real-time optimization methodology for route planning and other problems which can be readily customized to accommodate arbitrary metrics and constraints.

In order to accomplish these and other objects of the invention, a method of limiting a search space of a graphical optimization search process such as a route planning process is provided comprising the steps of determining a trajectory at a node to be expanded, defining sectors disposed around the trajectory in accordance with a first constraint, determining a lowest cost vector to a node which is separated by a length from the node in each sector, accumulating nodes corresponding to lowest cost vectors in a comparison engine such as a min-heap, and selecting and removing a further node to be expanded from the comparison engine.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
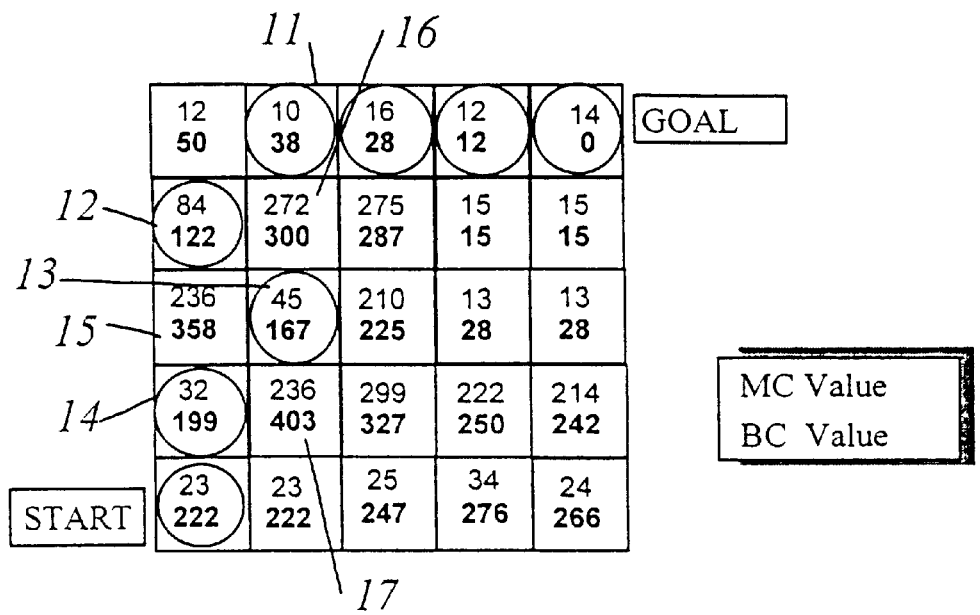
FIG. 1 is a depiction of a grid-based optimization problem useful in understanding an initial phase in a methodology in accordance with the invention.

Referring now to the drawings, and more particularly to FIG. 1, there is shown a graphical depiction of a grid-based methodology for finding a solution to an optimization problem such as a route plan to which the invention is preferably applied, possibly with variations which will be evident to those skilled in the art in light of the following description of the invention. Many such grid-based methodologies are known and some may duplicate the results illustrated in FIG. 1. By the same token, the methodology depicted in FIG. 1 is performed initially to provide inputs for the system and remainder of the methodology of the invention and other grid-based systems presently known may be equally suitable for that limited purpose within the context of the invention. However, it is to be understood that FIG. 1 depicts a preferred methodology for developing input information for the system and methodology in accordance with the invention and the inclusion of a grid-based system forms a part of the overall methodology of the invention. Accordingly, no portion of FIG. 1 nor its association with any portion of the remainder of the methodology discussed below is admitted to be prior art in regard to the present invention.

It should also be understood that while the invention will be described below in connection with route planning for aircraft in a two-dimensional domain (for simplicity), the methodology can be readily expanded and/or adapted to travel in three-dimensions or any other conveyance or mode of travel (including travel on foot or otherwise without a vehicle) over any terrain or combination thereof. By the same token, the methodology is also generally applicable to search techniques for any type of problem including performance of a sequence of combinations of actions (e.g. directions in a travel-based problem) which are also subject to metrics or constraints and which can benefit from limitation of the search space over which potential solutions may be distributed.

Route planning for aircraft is an extremely complex problem. Standard route planning algorithms usually generate a minimum cost path (based on a predetermined cost function, relating factors such as terrain features, threat locations, desirability of locations, etc.). Unfortunately, such a path may not represent an acceptable "flyable" path. A "flyable" path is one that does not (i) exceed the physical limitations of an aircraft, (ii) exceed the threshold comfort level and/or permissible workload of a pilot, or (iii) violate mission scenario parameters. In particular, many missions require several scenario parameters which impose contents on the resultant path, such as:

1. Distance Constraint: Constrains the length of the path to be less than or equal to a preset maximum distance. This could correspond to a finite fuel supply or a fixed time at which the goal must be reached.

2. Minimum Leg Length: Constrains the path to be straight for a predetermined minimum distance before initiating a turn. Aircraft traveling long distances may not want to weave and turn constantly because this adds to pilot fatigue.

3. Turning Angle: Constrains the generated path to only allow turns less than or equal to a predetermined maximum turning angle. Such a constraint may be aircraft or mission dependent. For example, aircraft flying in tight formation cannot make severe turns without a greater risk of collision.

4. Approach to Goal Position: Constrains the path to approach the goal position from a predetermined approach angle. This could correspond to the approach vector for a runway or for a mission objective.

In effect, it is necessary to be able to "personalize" the route based on aircraft limitations and/or mission parameters. The problem of creating such a route planner is quite difficult. In fact, an optimal solution to the general case of this problem is considered to be NP-Complete in nature (corresponding to a particular class of problems in which no polynomial time solution is known to exist). Even if such an optimal solution could be found (which is highly unlikely), the time to converge to a solution and the memory required would be completely unrealistic for real-time applications. Thus, an algorithm is desired which allows for the generation of solutions as good or better than a pilot or navigator could generate, sometimes referred to hereinafter as "near-optimal", in real-time (much faster than a pilot or navigator could do), using a finite amount of memory, while allowing the pilot to vary the four mission parameters outlined above or arbitrary counterparts thereof.

As background for understanding the system and methodology of the present invention, several route planning algorithms and data structures will now be discussed. Initially and returning to FIG. 1, a grid-type data structure is shown. Generally, such a grid (which will represent a data structure) is referenced to a group of contiguous, rectangular (not necessarily squares and other shapes such as triangles tiling the field could be used) areas representing the geography and other features of importance (e.g. areas of particular danger, obstacles and the like). Regularity of shapes is generally preferred as a matter of convenience but is not necessary. For example, distortion of regular geometric shapes or subdivisions thereof could be employed to conformally map the grid to more precisely represent features of importance such as enclosing the route of interest (e.g. some degree of expansion beyond the starting point and goal). The degree of subdivision of the grid represents the geographical resolution of the data structure which should be chosen in regard to the computing resources available and the speed and other aspects of the mode of travel.

The environment in which the route planning is performed is represented in FIG. 1 by a digitized array of (for convenience and clarity of explanation) square grid cells of equal size. A route is planned from a given "start" location to a "goal" location. Each cell corresponds to a particular location in the environment. Depending on the geography and other features of interest included within each grid cell, a cost estimation step establishes a "cost" value for traversing a particular grid cell, corresponding to the cost incurred by traveling through that particular region. This cost can be used to represent distance from the goal, fuel consumption, terrain features, threat exposure, weather conditions, or a number of other factors. This set of cost values is known as the map cost (MC) array and is of size n×n, corresponding to 5×5 in this example but more generally m×n.

A cost minimization step takes the MC array as input and generates a best cost (BC) array as output. Specifically, each cell in the BC array contains the cost of the cheapest (minimum cost) path to reach the goal from that particular cell and is preferably performed by traversing the grid in a reverse order from the goal to the start, generating BC values as the sum of MC value of that cell and the minimum BC value of any adjoining cell.

While movement in the BC array is theoretically allowed from any cell to any of the neighboring eight cells a relatively simple search algorithm (such as that described in "Highly Parallelizable Route Planner Based on Cellular Automata Algorithms by P. N. Stiles et al., IBM Journal of Research and Development, 38(2) pp. 167–181, March, 1994, which is hereby fully incorporated by reference, although other known search algorithms could also be used) is applied to the MC array to generate the BC array as described above.

The BC value of the grid cell of the start position contains the minimum total cost of a walking path from the start to the goal. The walking path is defined as the minimum cost path to the goal if one were walking over the ground and were not constrained by a maximum turn angle, distance limitations, etc. (e.g. the metrics and constraints discussed above which the methodology depicted in FIG. 1 does not directly accommodate). The simple example of generating a walking path from the BC array is shown in FIG. 1 by the cells containing circles. The upper value of each grid cell represents the cost value from the MC array. The BC values are shown as the lower value in each grid cell. The walking path, represented by the circled entries, corresponds to continually moving to the cell with the lowest BC value until the goal position is reached.

It should be understood that in the grid of FIG. 1, the number of cells in the horizontal and vertical directions is made unrealistically small in the interest of simplicity and clarity. In a practical scenario the number of cells in each coordinate direction could number in the hundreds if not thousands. As a practical matter to provide an acceptable degree of resolution for a representation of geographical and other features of interest, the geographic extent of a cell is generally based on speed and maneuverability of the mode of travel for which the route is planned but imposes a trade-off between optimality of the path and computational burden and time.

Practical values in respective coordinate directions for the geographical extent of a cell are about a quarter mile square for large ships, about one thousand feet for conventional aircraft, about sixty yards for a helicopter and about fifteen yards for a land vehicle. The sum of all cells in each coordinate direction must equal or exceed the extent of the route and generally will be a significant fraction (e.g. two-thirds) of the range of the vehicle.

It should also be understood that for aircraft, the grid for aircraft could be three-dimensional. Further, for other processes to which the methodology and system of the invention are applicable, an arbitrary number of dimensions dictated by the possible combinations of simultaneous actions could be employed in precisely the same manner; each combination having some figure of merit for the performance thereof and a walking path being generated in the same manner by, for example, summing minimum values of that figure of merit while traversing the grid from cell to cell. It is also possible and may be advantageous to develop several map cost (MC) values for each cell (corresponding, for example, to climbing or diving in a three-dimensional grid for aircraft or submersible vessels); among which values selection is made, for example, on the basis of the vector of entry to or exit from each respective cell.

While many variations of a grid-based analysis are usable as an initial process in accordance with the invention, as noted above, such grid-based systems cannot easily be made to accommodate constraints such as maximum total distance covered (e.g. vehicle range), minimum distance between turns, maximum turning angle or approach heading or position to the goal. For example, the above-described methodology may result in an extremely winding path or route which may violate both maximum distance and minimum distance between turns. Simply "straightening out" a generated walking path to meet the additional constraints (e.g., minimum leg length) will not necessarily lead to a good solution.

With such an approach, the path is traversed and a check would be made at each turning point to see if the turning point can be removed (e.g. joining the previous and next turning points with a straight line) without increasing the overall cost of the path by a preset limit (e.g., 10%) in accordance with a theory that by removing turn points, the path becomes straighter and thus is able to meet the additional constraints. This type of approach to meeting constraints has many limitations.

The primary drawback to such an approach is that there may be very few possible turning points that can be removed which do not increase the path cost by a significant amount such as the path through cells 11, 12, 13 and 14 of FIG. 1 which involve turns to avoid cells 15, 16 and 17. That is, with such an approach, there is no way to guarantee a minimum leg length or maximum total distance or to impose a maximum turn angle on the generated path without possibly traversing high cost or threat areas.

Figure 2:
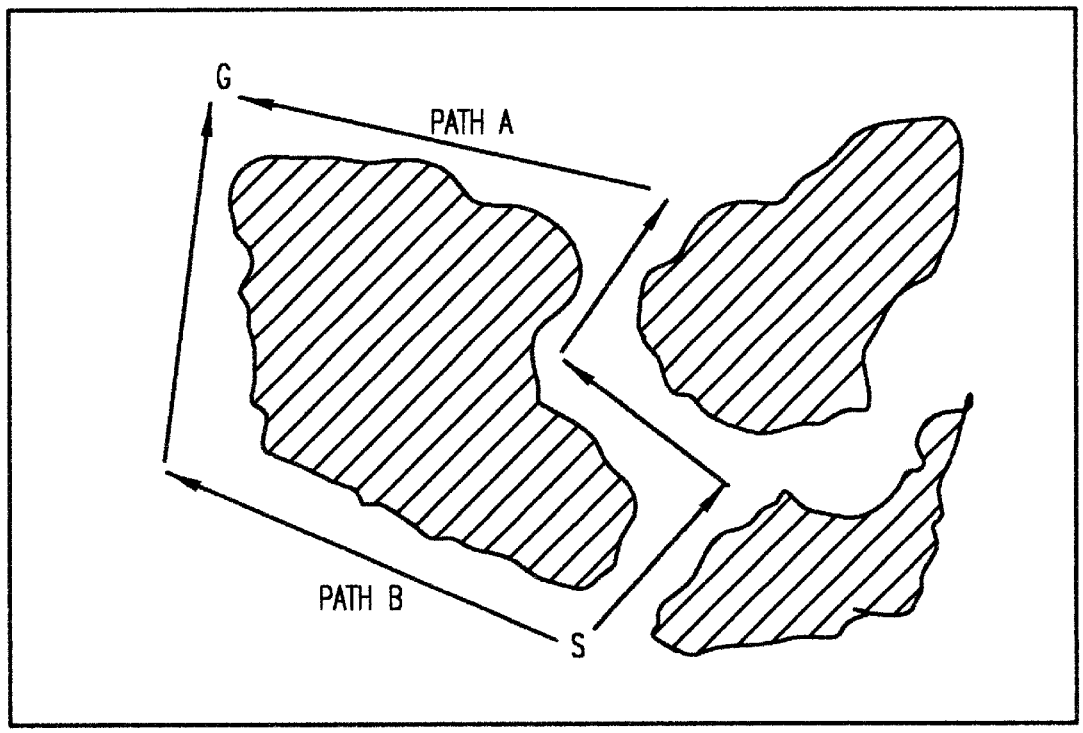
FIG. 2 is a route depiction useful in understanding a shortcoming of the prior art.

An example of this drawback can be seen in FIG. 2. Assume that Path A has a slightly lower cost than Path B. Thus, a turn point removal algorithm would seek to remove turn points from Path A to create a more flyable path. Unfortunately, Path A is a winding path and the removal of any turn points would result in traversing a high threat area indicated by the shaded regions.

Path B would be the logical choice since it has fewer turns and a longer leg length than Path A. Unfortunately, the type of approach described above would never find Path B since it was considered to be of slightly higher cost than Path A and thus accommodation of additional constraints would be limited to variations of path A. A different approach is therefore needed to keep track of different paths based on a combined metric (e.g. turns and leg length) as well as the total cost of the path. This additional requirement has greatly increased the complexity of the problem under known processing techniques since the search space and memory requirements would necessarily be greatly expanded.

In accordance with the invention, this problem is solved by using the BC array as the input to the main route planning algorithm which generates the final flyable path as will now be discussed. As noted previously, the system and methodology of the invention must generate a path of minimum total map cost (MC) that has, for example, the preferred characteristics of minimum leg length, maximum turn angle, maximum length of path and approaches the goal from a predetermined direction.

To realize these functions the invention employs a novel approach called Sparse A* Search (SAS). The SAS technique is a novel variation of the standard heuristic searching algorithm A* (pronounced "A-star") approach which has been used quite extensively in route planning and graph searching algorithms. Essentially, while the A* technique employs a search technique of summing the cost to reach an intermediate point with an estimate of the cost to reach the goal from that intermediate point and evaluating all points and all angles from which the point may be reached, the novel SAS technique employs the same optimization criterion but searches only points where the optimum path is likely to lie.

Before describing the SAS approach, a brief overview of A*, in general, is presented for comparison. A detailed discussion is provided in "A Formal Basis for the Heuristic Determination of Minimum Cost Paths" by Hart et al., IEEE Transactions on Systems and Cybernetics, 4(2); pp. 100–107, July, 1968, which is hereby fully incorporated by reference.

A* is an optimal, best-first search heuristic that computes a cost function for various locations in an environment. A* explores the search space by computing a cost function for each possible next position to search, and then selects the lowest-cost position to add to the path. The addition of this new location to the search space is then used to generate more path possibilities. All paths in the search space are explicitly represented using pointers from each position back to the previous position from which that position was derived. The cost function that is minimized at each step of the A* propagation is shown below.

$$f(x)=ag(x)+bh(x) \qquad \text{Equation 1}$$

In Equation 1, $g(x)$ can be any function which expresses the actual cost from the start position to the intermediate position x. The value $h(x)$ similarly can be any function which expresses the estimated cost from position x to the desired goal position. The values a and b are parameters used to weight the actual and estimated costs and are usually set to 1. At each step in the A* propagation, the lowest $f(x)$ value is selected and inserted into a sorted list of possible paths. It has been proven that if the actual cost from x to the goal is greater than or equal to the estimate, $h(x)$, of this cost, then the solution produced by A* is guaranteed to be a minimum-cost solution.

The problem with the A* approach is that, depending on the map costs of the individual cells in the environment, the algorithm may take a very long time (exponential in nature), and use an unbounded amount of memory to converge to an optimal solution. This is especially true for angle constraints in a grid environment. For such a case, a single grid cell could represent an almost infinite number of nodes in the A* search space since each cell could be entered by a proposed path from a different angle. For cases such as these, a true A* approach will not work for the problems discussed previously due to the time constraint for real-time planning systems. To overcome these difficulties, the SAS approach in accordance with the invention accurately and efficiently "prunes" the search space to allow the generation of a near-optimal solution that converges in real-time as will now be discussed.

To efficiently explore the search space, a data structure known as a min-heap is preferably used. A detailed discussion of heaps can be found in "Introduction to Algorithms", by T. H. Cormen et al., McGraw-Hill, New York, N.Y., 1990, and is hereby fully incorporated by reference. A min-heap is a binary tree whose keys (value stored at a node) satisfies the heap property that the key of every node is less than or equal to the key of any of its "children" (i.e. lower nodes of the heap). Algorithms are known for examining values to be added to the heap and to place them in locations in the heap in a manner which maintains the heap property of interest and to reorganize the heap to maintain the property when a value is removed for the heap. A min-heap is, in essence, a data structure which autonomously functions to effectively and continually compare a plurality of values since a larger value than other values in the heap will be inserted at the base and will advance toward the root as elements are removed from the heap.

Figure 3:
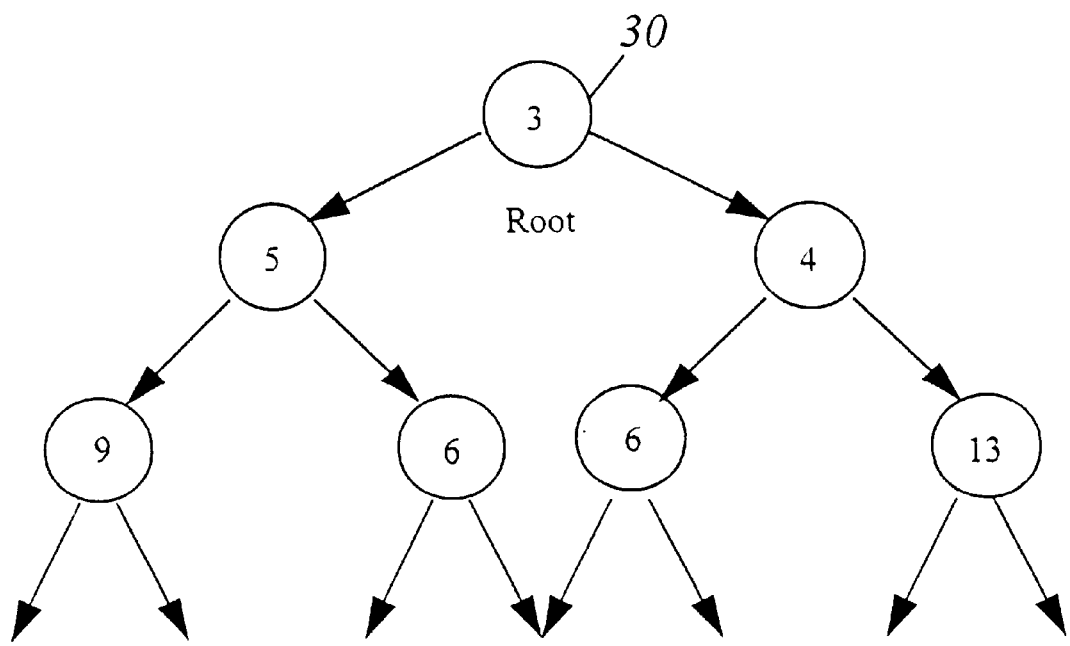
FIG. 3 is a depiction of min-heap of seven elements useful in understanding a second phase of the methodology in accordance with the invention.

An example of a simple min-heap is illustrated in FIG. 3. The root, corresponding to the minimum element in the heap, is indicated at 30. Min-heap data structures are useful for implementing the following two operations:

Insert(x): Inserting a node x into a heap with n elements in $o(n \log n)$ time, and Remove_Min(x): Removing the minimum element from the heap (found at the root) and reestablishing the heap property for the remaining elements in $O(n \log n)$ time which is sometimes referred to hereinafter as "popping", as distinct from "pruning" which refers to the process of limiting the heap size to contain a predetermined maximum number of elements based on computational and storage constraints.

Figure 4:
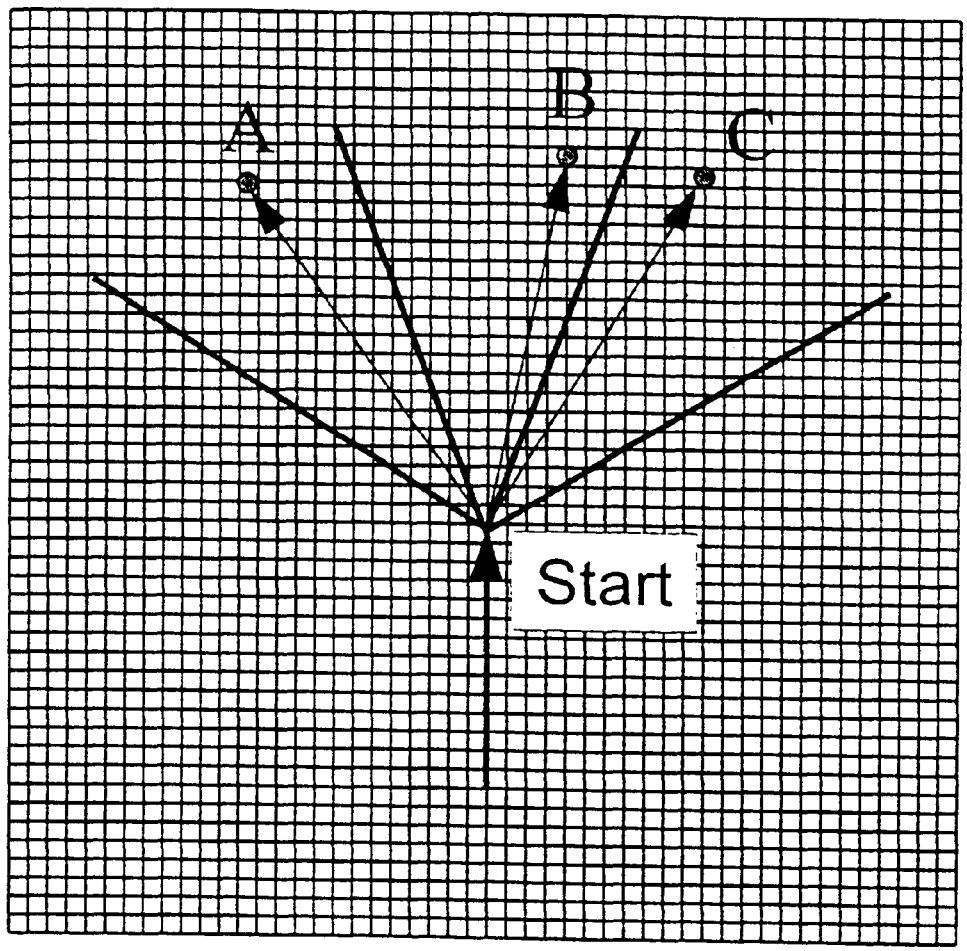
FIG. 4 is a depiction of a geometrical construction useful in understanding accommodation of a maximum turn angle constraint in accordance with the invention.

For a given start location, goal location, initial trajectory, minimum leg length and maximum turning angle there are a finite number of cells that can be reached from the start location while accommodating the maximum turning angle and the minimum leg length. FIG. 4 shows an example of one initial fan-tail from the start position (the initial fan-tail can span any number of degrees, but the preferred implementation is a full 360° to allow for an arbitrary starting trajectory). The fan-tail, as illustrated, is preferably divided into 3 sectors. A vector is generated for each cell on an arc of length L from the start location. Only the minimum cost vector (indicated by the arrows) from each of these sectors is inserted into the min-heap H for later propagation to reduce search space and storage requirements to thus limit the amount of time required to converge to a solution.

These cell positions form new intermediate points having a value, $f(x)$, derived in accordance with Equation 1, above. In deriving $f(x)$, the value of $g(x)$ is derived from the MC value of the cell and cells traversed by the vector and $h(x)$ is derived from the BC value of the cell (as an estimate of a lower bound of the cost to reach the goal from that cell). The cost value $f(x)$ thus found by summing the map cost values of all cells the vector of length L traverses and the estimate $h(x)$ may be normalized to account for different numbers of cells traversed or different lengths of the vector which overlies respective cells.

It should be noted that the number of sectors can, in theory, be freely chosen based on available memory and computing resources and the number of branches (one for each sector) to be propagated at each node depend on the degree of optimality required of the solution. For a given angular resolution between vectors, the number of vectors per sector will decrease as the number of sectors increases and the number of sectors determines the number of vectors which will be stored for later propagation. As a practical matter, however, the number of sectors will generally be determined by the available computational resources. It is also considered to be desirable to provide an odd number of sectors so that the heading at the origin will not occur at a sector boundary and thus tend to force additional small turns and/or introduce a computational complexity of arbitration of the sector to which a sector boundary is assigned.

The MC array provides the values for g(x) in Equation 1 by computing the sum of the MC values along each vector. Each of the vectors terminates on an arc of radius L which spans the angle of the fan-tail as shown in FIG. 3. Further, in accordance with the invention, the BC array, generated in the cost minimization step described above, provides the values for h(x).

The BC array is preferred because it can be easily and rapidly computed from the MC array and represents a lower bound on the cost of the path from an intermediate node x to the goal position. The BC array thus qualifies for use as an estimate of the cost to reach the goal from a given point in accordance with Equation 1 which guarantees an optimal solution within data resolution, as noted above. It should be recalled that the BC array contains the minimum cost walking paths to reach the goal position from any location in the environment. Since turn and distance constraints must be introduced into the path, doing so can only increase the cost of the generated path. Thus, the BC value must be a lower bound for the search. The choice of using the BC array is also significant because the BC values force the graph search to concentrate, within the given constraints, on areas with a higher probability of containing the minimum cost route.

In accordance with the system and methodology of the invention, at each iteration of the search propagation, the minimum cost node of each sector is added to the min-heap and the minimum cost node of the entire min-heap structure (including the nodes just added) is selected and removed from the root location as the next node to expand and the heap reorganized (e.g. "reheapified"). This process continues until the goal position is reached. A Sparse A* Search Tree (SAST) stores the minimum cost nodes removed from the min-heap and is used to reconstruct the final route once the goal has been reached.

More specifically, the preferred procedure is as follows and is illustrated in greater detail in FIG. 11:

1. Create a "fan-tail" (as illustrated in FIG. 4) of 2 times the maximum turning angle constraint from the start position about the trajectory (an aircraft can turn right or left not more than the maximum turning angle). Initially, the fan-tail can span 360° to allow for an arbitrary starting trajectory. The length of the fan-tail equal to the minimum leg length, L, constraint.

2. Divide the fan-tail into S sectors (except for the initial fan-tail, where the number of sectors can be any number, e.g. 32).

3. Compute the cost of every vector of length L to cells having a point at distance L from the origin of the fan-tail in each of the S sectors. The angular resolution of the sectors can be freely chosen in accordance with the computational resources available. Select the minimum cost vector (based on f(x)) from each sector and insert these vectors into a min-heap H.

4. Remove the minimum cost (root) element from the min-heap, H, and expand the search space to that position. Expanding the search space involves repeating Steps 1–4 from this new position.

5. Once a node is removed from the min-heap, it is expanded and simultaneously stored in the SAST structure to keep track of which nodes were expanded and the direction from which the route entered that particular cell.

6. Repeat the procedure until the node removed from the heap is within one leg length, L, from the goal. (When this occurs, a separate "end game" process is used which is arbitrary and may be as simple as defining a last segment between the current location and the goal to complete the process quickly with minimal further processing to guide the aircraft or other vehicle to the final goal position.

7. If the heap, H, ever becomes empty before the goal position (within one leg length) is reached, the algorithm terminates since a path to the goal cannot be found within the given problem constraints and parameters. If such a case occurs, the parameters are changed and the route planning algorithm is rerun.

8. Trace back the path up the SAST until the starting position is reached. This results in a minimum cost path (based on the pruned search space) and a near-optimal global path from the start to the goal.

To accommodate practical limitations on memory requirements and to obtain real-time performance it should be recalled that the nodes of the SAS search space are stored in a min-heap data structure. If the memory allocated to the heap is unbounded, the algorithm will eventually terminate and generate a minimum-cost path to the goal (within the given resolution of the search space). Unfortunately, for very large environments (e.g. the number of cells of the MC/BC grid), the time to converge to a solution, even by the above-described efficient SAS approach, may be too long for real-time applications and require more memory than can practically be allocated. Because of this, the size of the heap can be limited to force less desirable solutions to be pruned from consideration.

While such a recourse allows the generation of faster solutions and requires less memory, the main drawback is that by "pruning" the heap (regardless of the method used) there exists the possibility of good routes being removed. Thus, if the maximum heap size is set to too small a value, then possible paths leading to near-optimal solutions may be inadvertently discarded. The larger the heap, the better the chances for obtaining an optimal route. Therefore, the pruning strategy must be carefully developed to minimize the likelihood of discarding a heap value that could represent part of a near-optimal solution.

Thus, in accordance with a preferred feature of the invention, when a new element is added to the full min-heap (e.g. after the min-heap has already reached its maximum allotted size), random locations at the base of the min-heap are selected and the element to be inserted is compared to the current element at those positions. If the cost/value of the new element is smaller than any of the elements to which it was compared, the new node replaces that element and the heap is reorganized to maintain the heap property as discussed earlier. If the cost/value of the node is not smaller than at least one values at the base of the min-heap, the node is discarded since it is considered more likely that the nodes having smaller cost values already in the heap will lead to near-optimal solutions than the discarded node. Essentially, this strategy maintains only the smallest node values in the heap. This comparison thus limits the likelihood that a good solution will be discarded and can be visualized from the illustration of FIGS. 3, 4 and 7.

First, it will be assumed for simplicity that the min-heap has only the capacity to contain a maximum of seven nodes in three levels (base, root and an intermediate level) as shown in FIG. 3. Upon the first iteration of the process described above and beginning at a start location, a fan-tail such as that illustrated in FIG. 4 is generated and a lowest cost node (A, B, C) is identified in each sector. These nodes are placed into the min-heap and, upon the reorganization of the heap, one of these nodes, say A, will reach the root of the heap and be popped off the heap for expansion.

Figure 7:
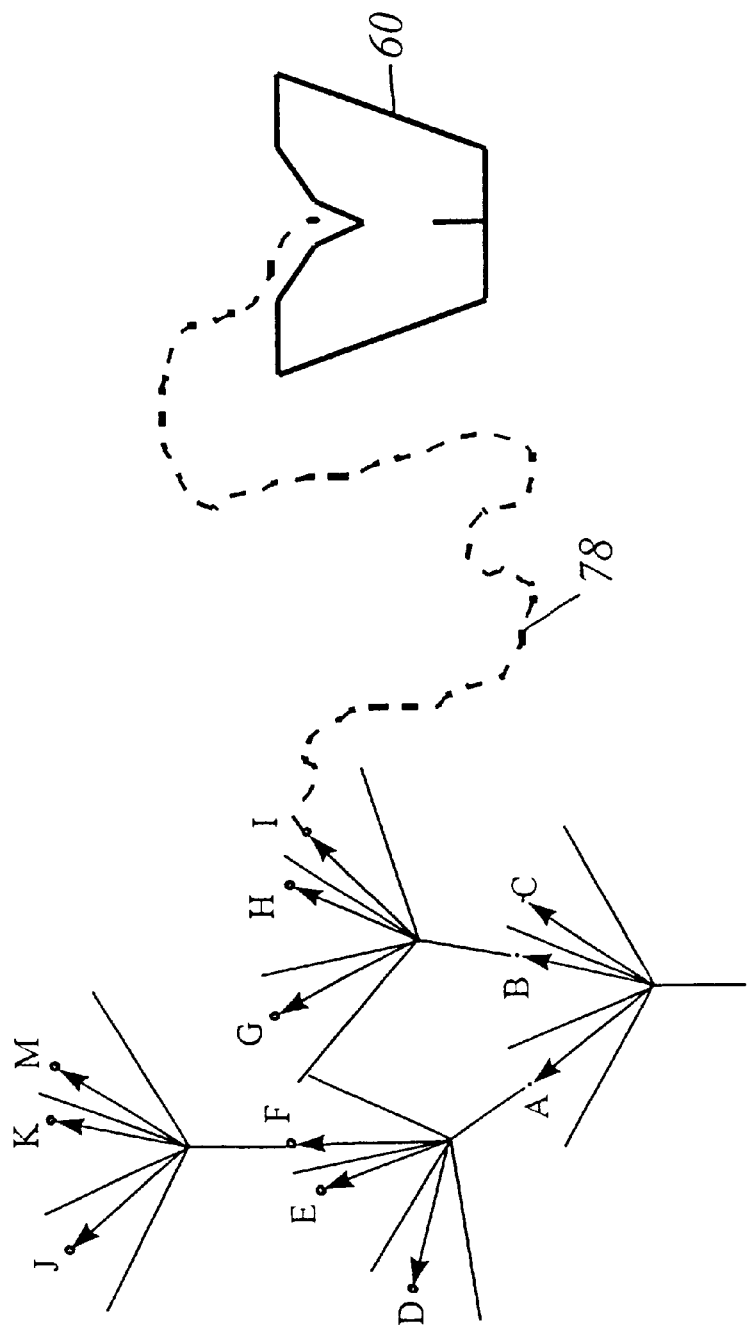
FIG. 7 depicts a summary of the three phases of operation of the system and method of the invention depicted in FIGS. 1, 5 and 6, FIGS. 8, 9 and 10 are maps depicting operation of the invention to develop a routing solution shown thereon under differing constraints and metrics.

When node A is expanded, as shown in FIG. 7, and lowest cost nodes (D, E, F) identified in each of three sectors and these nodes added to the heap, the heap will then contain five nodes (D, E, F, B and C). When the heap is now reorganized, it is possible that node B will have the smallest cost value and reach the root of the min-heap. Thus, node B will be the next node selected for expansion even though it was not generated by the most recent expansion.

When node B is expanded in a similar fashion to create nodes G, H and I which are added to the heap, the heap will then contain seven nodes (D, E, F, G, H, I and C) and, if limited to the size of heap illustrated in FIG. 3, will be full. Again, the heap will be reorganized and the node having the smallest cost value (e.g. node F) will reach the root of the min-heap and be selected and removed for expansion into nodes J, K and M. Only one of these values (e.g. node J) can be accommodated by the min-heap and is placed therein and the heap is reorganized, as before.

Just as the smallest cost value will be placed at the root of the min-heap, the largest values will be placed at the base by reorganization of the heap. Cost values of nodes K and M can now be compared to values at the base of the heap and node K and/or M added to the heap only if their cost value is smaller than that of a node at the base of the heap. Thus, nodes having larger cost values can be continually discarded once the min-heap (of arbitrary capacity) is filled. For example, if node K has a lower cost value than node C if node C is at the base of the min-heap it is assumed that it can be safely discarded in favor of node K. By the same token, this process also effectively compares nodes K and M against node J (which may or may not have a cost value large enough to be placed at the base of the min-heap). The discarded nodes will generally represent a lower likelihood of being in the best solution.

It should also be appreciated from this description of the process in accordance with the invention that, if any node such as node C is small enough to remain in the heap, it can potentially be expanded if it is ever found to be smaller than all other nodes in the min-heap and a path branching from node C would then be followed while the cost values of nodes branching therefrom continued to have the highest likelihood of being part of the near-optimal solution. Thus, while limiting required computational resources and reorganizing the min-heap in a potentially autonomous and/or parallel process, the search is additionally expedited by expanding nodes which unconditionally represent the greatest likelihood of forming a part of the near-optimal solution at any given point in the search process. Nodes which can potentially be discarded represent a low likelihood of being useful.

It should also be noted that expanding the node presenting the greatest likelihood of success at any given point in the search process also avoids the need to retrace backward through the search to exhaustively explore branches not taken, conversely, any particular path can be resumed at any terminal node which has not been discarded when that node presents the lowest cost value in the min-heap.

It should be further appreciated that the discarding of nodes which are newly generated or for which a substitution has been made, effectively prunes the expanded search space and discards solutions which could exist in the expanded search space extending beyond any discarded node.

The distance constraint corresponds to the maximum allowable length of a flyable path and also presents a good strategy for pruning of the heap with little computational cost. The distance constraint could represent a finite amount of fuel for a particular mission or a constraint on arrival time. No paths of length greater than this distance (referred to as d-max) should be considered as possible paths.

Figure 5:
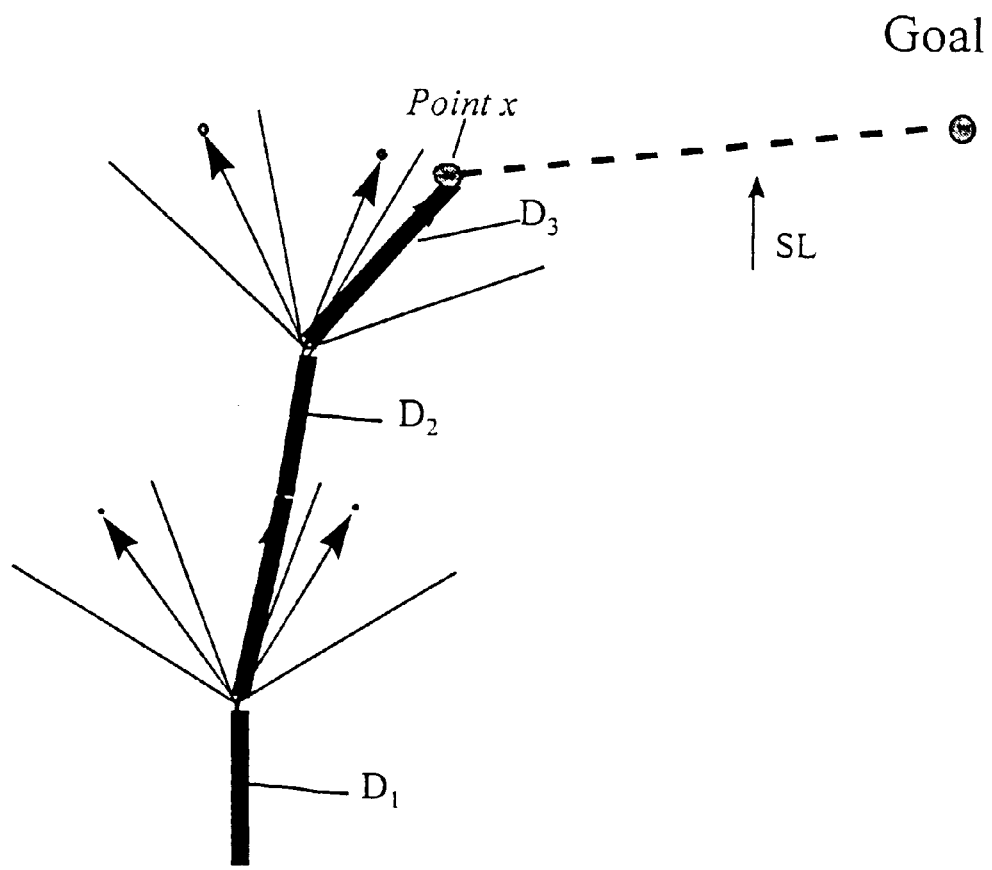
FIG. 5 is a depiction of a geometrical construction useful for expansion of the methodology depicted in FIG. 4 while accommodating a minimum distance constraint.

As discussed previously, the Sparse A* Search Tree (SAST) keeps track of what locations have been searched in the environment. This corresponds to the nodes popped off the SAS min-heap. Testing for satisfaction of the d-max constraint for each vector prunes the heap to only check paths less than a certain length. For a given node x, the node x (the vector node which includes a cost value f(x), by which the vector node is sorted in the min-heap, and preferably includes other information such as cost, location, vector length and the like) is only added to the min-heap if $D(x)+SL(x) \leq$ d-max where $D(x)$ is the actual distance of the calculated path to reach x from the start position and $SL(x)$ is the straight line distance from x to the goal. That is, the straight line distance to the goal is added to the current length of the path since the straight line distance is the lower bound of the path length from node x to the goal. An example of this is shown in FIG. 5. If, for example, $D_1+D_2+D_3+SL$ is greater than d-max, the point x will not be part of an acceptable solution and need not be added to the heap. Additionally, if none of the minimum cost vector expansions from the root of the min-heap satisfy the distance constraint, the root node need not be placed in the SAST since it cannot be satisfactorily expanded.

The introduction of a d-max constraint has other benefits and uses in the route planning methodology of the invention, as well. For example, even when there are no fuel or time constraints on the path, d-max can be used to effectively generate straighter (possibly more desirable) routes, since d-max limits the amount of turning possible in the resultant path. It also significantly speeds up the search time by eliminating further expansion of portions of the search space which cannot lead to solutions. The effect of adjusting d-max for this purpose can be observed by comparison of FIGS. 8 and 9.

Figure 8:
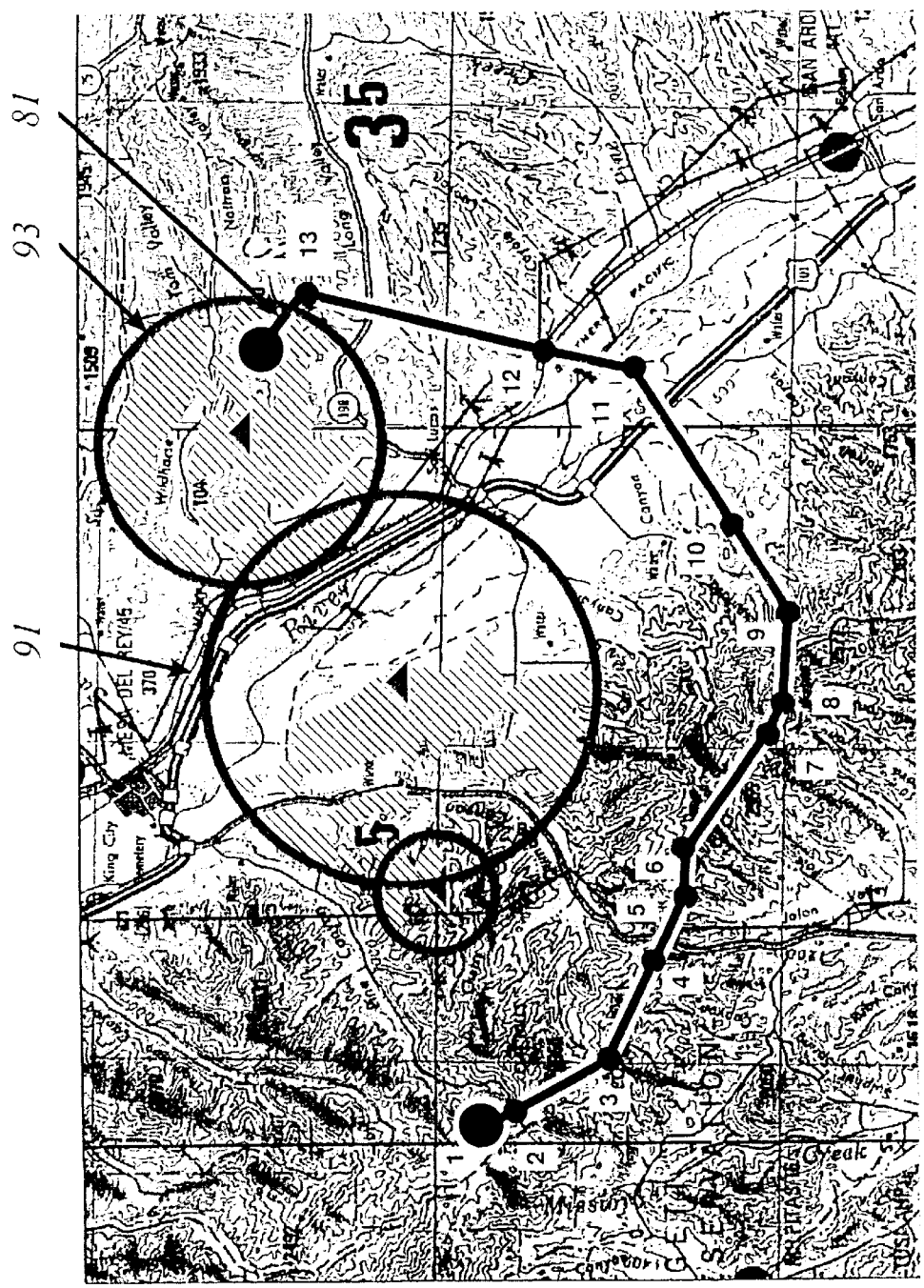

FIG. 8 represents a solution found by the invention for a d-max equal to 2.5 times the straight line distance between the start and goal locations. For the solution found in FIG. 9, d-max was reduced to 1.3 times the same straight line distance. Note that in FIG. 9, the route much more closely approaches threat circle 91 and continues for a greater distance 92 within threat circle 93 compared with distance 81 of FIG. 8. In other words, since the MC and BC values are higher in threat circles 91 and 93, the total cost value of the route in FIG. 9 is greater than that of the route depicted in FIG. 8, but the overall route is considerably shorter, much less circuitous and turns are fewer.

Figure 9:
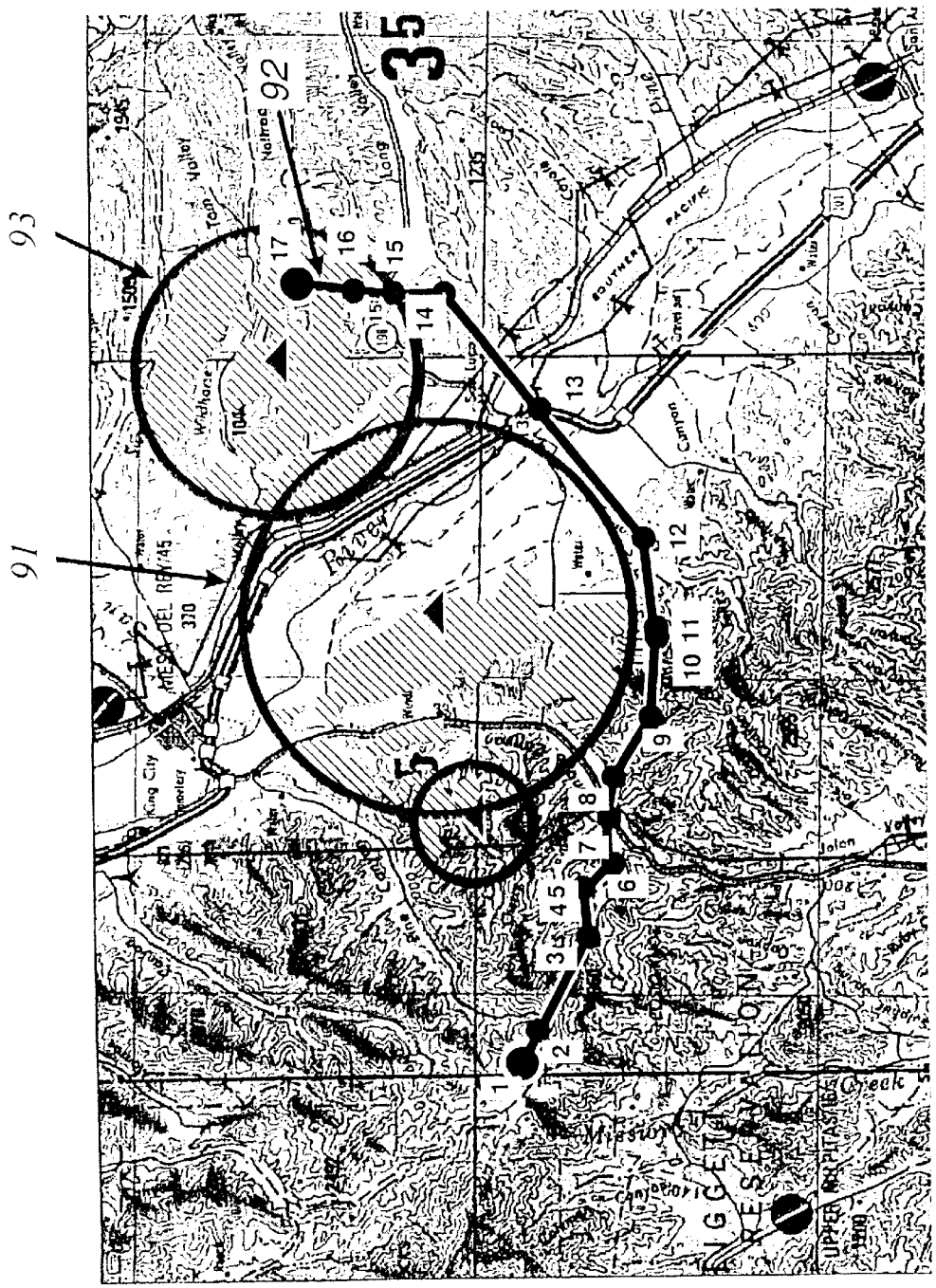

However, it should be understood that the solution of FIG. 9, while being straighter and shorter, nevertheless represents a higher cost and is thus less desirable (from a cost standpoint) route than the solution of FIG. 8. It should be kept in mind that the d-max constraint is principally to ensure that time and/or fuel consumption requirements are met and use of the d-max constraint to generate or force alternative solutions can thus be seen as a technique for evaluating trade-offs between time or fuel and costs or risks (e.g. map costs, MC, as to which some degree of uncertainty may exist).

Figure 6:
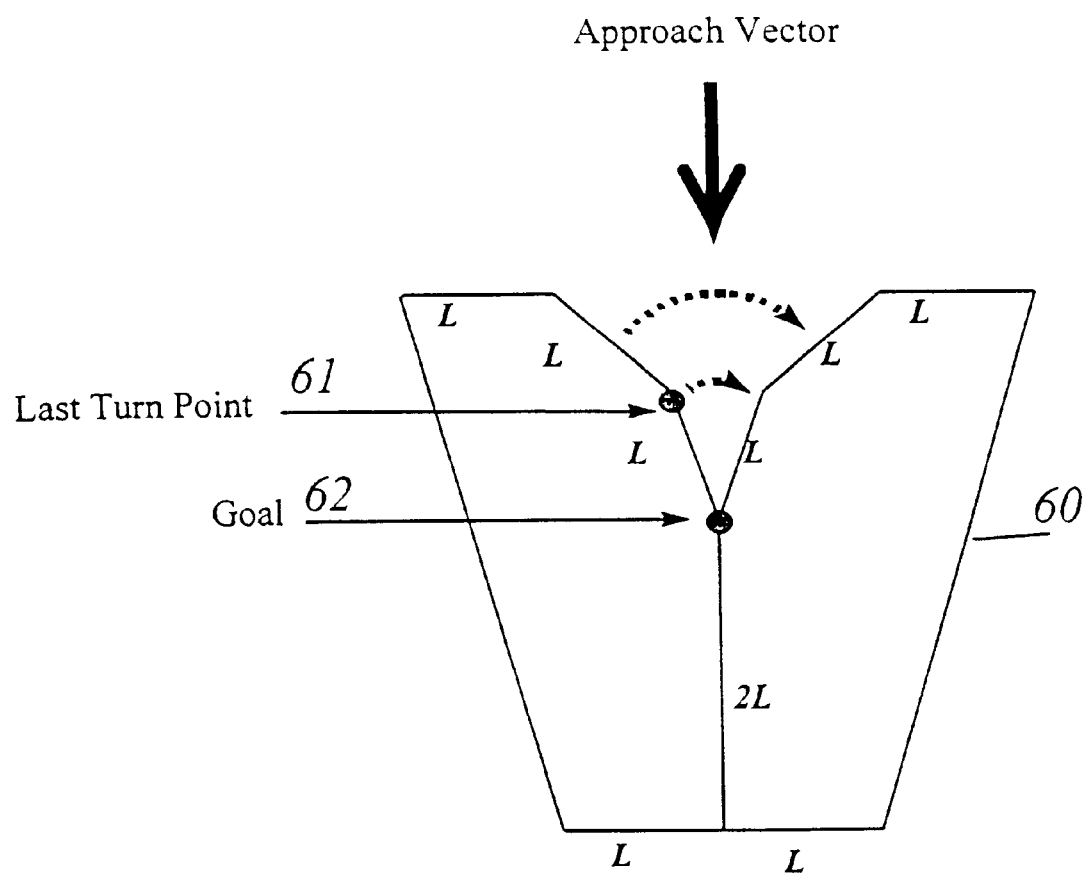
FIG. 6 is a geometrical construction useful in understanding a final stage of the preferred methodology of the invention in regard to a preferred application thereof.

As a perfecting feature of the invention a final stage of the route planning methodology and system of the invention will be described with reference to FIG. 6. As alluded to above, this feature is used to modify the operation of the invention as described above in order to accommodate a constraint on the direction of approach to the goal. To do so with minimal modification or complication of the process described above, the cost/values in the MC/BC grid are altered, most conveniently by increasing cost in the MC and BC values already present in the grid in the vicinity of the goal location. This "artificial" increase of the cost/values serves to force a solution which accommodates the constraint.

It should also be recognized that the increase is not necessarily "artificial" when the location is a final destination rather than an intermediate point which can be potentially traversed on a route. For example, terrain features and obstacles near an airport carry a much higher "cost" when they must be avoided at low altitude rather than simply flown over at high altitude. It should also be recognized that, at a relatively rudimentary level, this feature of the invention also provides a preferred methodology for extending the number of dimensions reflected in the grid (e.g. by providing a weighting factor with altitude which may be some linear function of altitude relative to various attributes of the terrain feature, obstacle or other threat).

In a preferred form of this feature, the cost/values are increased by a factor of two or more in a bucket-shaped region around the goal location. The preferred bucket shape illustrated in FIG. 6 is formed from segments of length L to be in accord with the minimum turn separation and maximum turn angle constraints discussed above with the top being shaped at expanding angles (preferably corresponding to the maximum turn angle and minimum leg length constraints) in the manner of a horn symmetrically around the approach angle. The bottom of the bucket is preferably of a width 2L and placed 2L behind the goal in order to force the approach from the opposite side. This effect is enhanced by the width of the top of the bucket being 4L or greater to avoid placing a last turn location 61 at a point significantly less than L from the goal 62, as illustrated. The bucket size can, however, be of reduced dimensions if the above dimensions result in the avoidance of too large an area (e.g. if the distance, L, specified for the remainder of the route is unrealistically large for a final destination route pattern).

Figure 10:
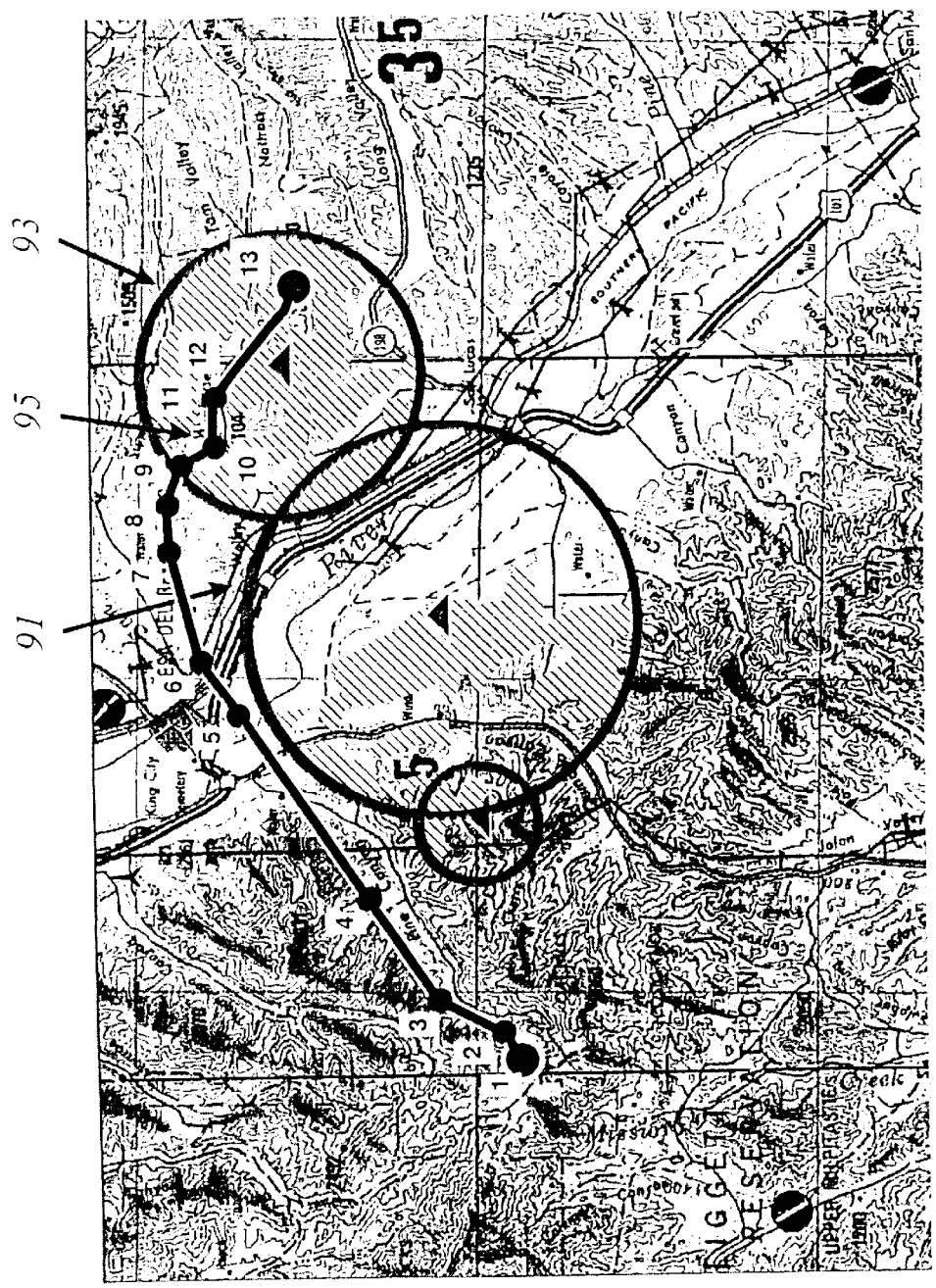

The effect of this perfecting feature of the invention can be appreciated from a comparison of FIG. 9 and FIG. 10 which is also constrained by a d-max of 1.3 times the straight line distance between the start location and the goal. While the approach direction was not constrained in the routes depicted in FIGS. 8 and 9, the approach angle constraint of 135° (North being 0° and East being 90°) was used for the solution depicted in FIG. 10 found by the invention.

Note that the solution route depicted in FIG. 10 proceeds North of threat circle 91 and traverses a larger portion of threat circle 93 than in the route of FIG. 9. However, it should be recalled that the maximum turn angle constraint would greatly increase the distance traveled within threat circle 93 to achieve the same approach direction if threat circle 91 were to have been avoided by the southern route of FIG. 9. It should also be noted that while the tight d-max constraint tends to straighten the route solution found, the route of FIG. 10 is somewhat tortuous in region 95 within threat circle 93 to traverse through the lowest cost regions within threat circle 93.

Having described respective features and phases of the system and methodology of the invention, a preferred form of the invention will now be described in connection with the flow chart/high-level block diagram of the invention shown in FIG. 11. It should be noted in this regard that the flow chart of the preferred process has been augmented by the inclusion of three data structures 1130, 1140 and 1150 and data flow paths to and from the same to various process steps. While it is preferred to perform the process of the invention with a suitably programmed general purpose data processor and to allocate memory therein to the respective data structures during initialization or some other part of the application program, it should be understood that special purpose processing structures (or plural suitably programmed general purpose processors) could be provided for each step in a generally pipelined fashion and dedicated memories provided for the respective data structures.

Figure 11:
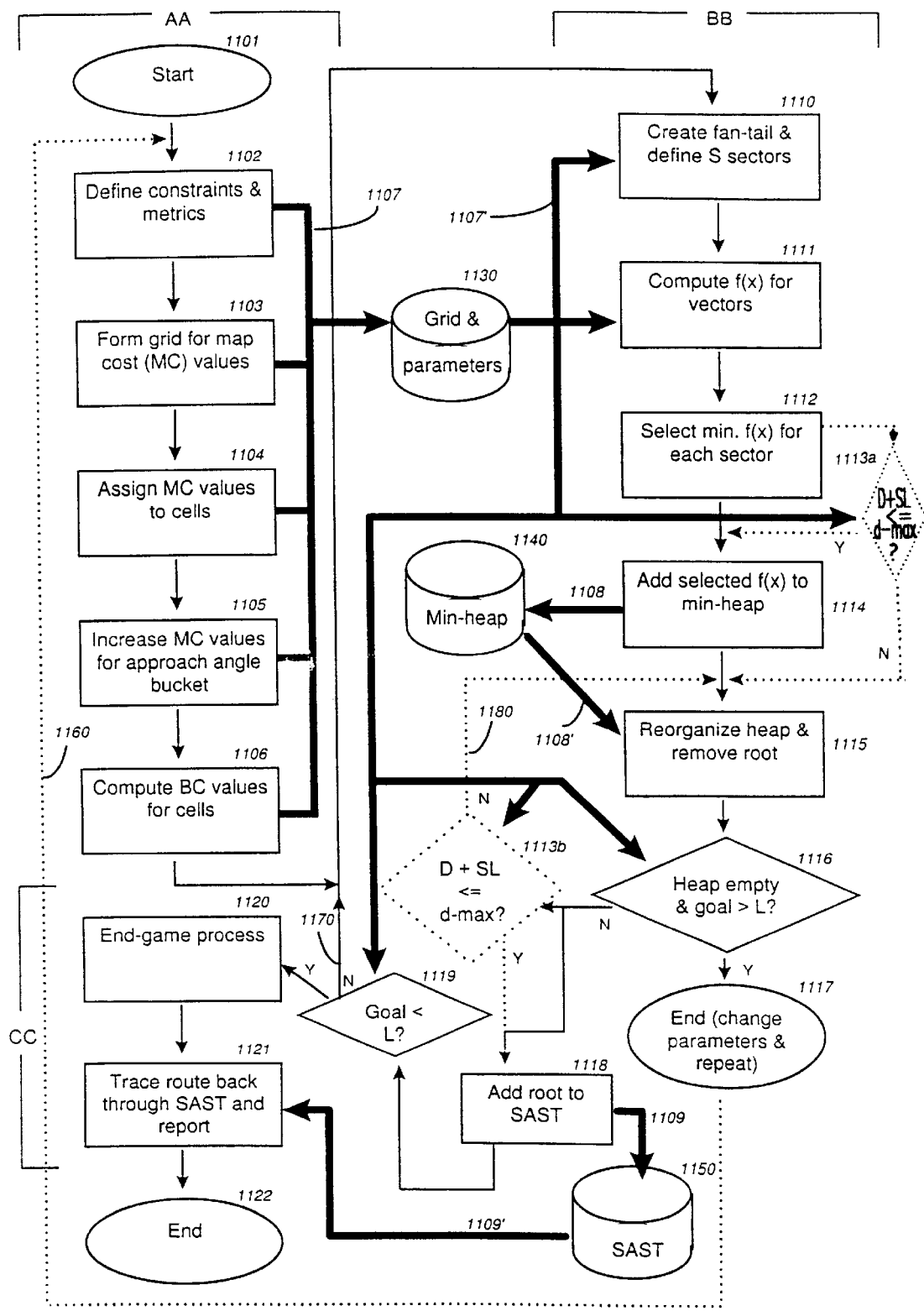
FIG. 11 is a flow chart or high level block diagram of the method and system of the invention.

It should also be appreciated in this latter regard that the process depicted in FIG. 11 includes only two loops 1160 and 1170 and possibly a third loop 1180 and only one conditional branch 1113a or 1113b for testing of the d-max constraint other than the conditional branches for exiting from the respective loops. Therefore, the process lends itself well to parallel processing to improve real-time performance.

It may also be helpful to initially observe that the process of FIG. 11 comprises three separate phases, generally indicated by brackets labeled AA, BB and CC. Phase AA comprising steps 1102–1106 basically develops data by a grid-based process which will be used throughout phase BB. Phase BB, comprising operations 1110–1119, performs a graph-based process which is implemented by a novel sparse A* iteration process (SAS). Phase CC, comprising operations 1120 and 1121 is an output phase for efficiently terminating the process and reporting the solution when success is assured. A "snapshot" of the route developed is shown in FIG. 7 in which the fan-tails successively generate segments of path 78 which terminates in the bucket-shaped area 60 of increased cost values to force a desired angle of approach to the goal. The overall process is thus seen to be a hybrid of grid-based and graph-based techniques combined in a manner to avoid the problems associated with each respective methodology when used alone and to achieve processing efficiencies through use of the BC value stored in the grid data structure 1130 as a cost estimate to enhance accuracy and provide results in real-time.

The SAS preferably utilizes a min-heap 1140 to perform comparisons of cost/values associated with vectors and a Sparse A* Search Tree (SAST) 1150 to store values (e.g. location, direction, cost) extracted from the min-heap as minimum cost nodes of the near-optimum route as it is developed.

Beginning at 1101, the constraints and metrics of the route are entered and stored in grid and parameter data structure 1130 (shown as a single data structure for convenience but separate data structures could be used) over bus 1107, as shown at 1102. As depicted at 1103, the grid is defined and mapped to geographical areas and values representing the cost of traversing each cell of the grid are assigned as map cost (MC) values at 1104. The grid definition and MC values are stored in the grid and parameter data structure 1130 as before. If a goal approach constraint is to be applied, the MC values surrounding the goal in a preferably bucket-shaped pattern are increased by addition or weighting as shown at 1105 and stored at 1130. Once these MC values are assigned to each cell of the grid, the MC values can then be processed in the manner described above in connection with FIG. 1 or a similar manner to derive best cost (BC) values for each cell, as depicted at 1106, and stored at 1130. This completes phase AA and the process of collection of the data that will be used in the graph-based processing of Phase BB which determines a route in accordance with input constraints.

The graph-based processing in accordance with the sparse A* iteration process begins with the creation of a fan-tail constructs of FIG. 4 and definition of sectors therein at 1110 from a maximum turn angle constraint and minimum leg length constraint retrieved from data structure 1130 over connection 1107'. Therefore, the fantail from the starting position preferably extends over 360° and, thereafter, the fantail is restricted to the maximum turning angle on either side of the entrance trajectory of the node being expanded. This allows for an arbitrary starting direction but constrains the turning angle at intermediate points. Of course, the starting trajectory could be constrained to limited possible trajectories, as well, either through limitation of the direction of fantails initially generated or by specification of MC values near the starting location; either of which could be used to represent similar conditions or costs.

(It should be understood that, in principle, different values for any metric or constraint can be retrieved and applied in accordance with different segments of the route, if desired, without departing from or significantly complicating the principles or operations of the invention. For example, the maximum turn angle allowed could be decreased and/or the minimum leg length could be increased with time or distance to compensate for pilot fatigue. However, the invention has been discussed under the assumption that only a single value for each metric or constraint is used since the change of metric or constraint values is simply a matter of retrieval of the differing values from different memory addresses in accordance with some criterion.)

Then, as depicted at 1111, the cost value for every vector in each segment is computed and the minimum cost/value f(x) for a vector having an end-point x in each segment is selected at 1112. At this point a test can be made for violation of the d-max constraint (1113a) or, optionally, the test can be performed later (1113b) although the earlier point in the process is preferred as less complex, equally efficacious and more consistent with avoidance of placing nodes in the heap which offer little or no likelihood of forming part of a near-optimal solution. If the test is performed and satisfied or if the test is not performed, the minimum cost/value f(x) value selected for each sector is added to the min-heap 1140 over connection 1108 as depicted at 1114. If the test is performed and not satisfied, this step is by-passed.

It should be noted that (after a few iterations of the process) only a single vacancy or possibly a second vacancy (due to removal of a node whose expansion violates the d-max criterion as discussed above) will exist in the min-heap at this point in the process while expansion of a node by creation of a fan-tail at 1110 and evaluation at 1112 will make a number of candidate nodes available equal to the number of sectors. To accommodate or discard other candidate nodes, a comparison with the values at the base of the min-heap is preferably done after a reorganization of the heap as described above so that nodes having values larger than the new candidate nodes can be removed and discarded from the min-heap to accommodate new candidate nodes reflecting a higher likelihood of forming part of a near-optimal solution.

Then on each iteration of the process, the heap is reorganized and the root of the min-heap is retrieved over connection 1108' and removed from the min-heap by known techniques as depicted at 1115. A test (1116) is then performed to determine if the heap is empty and the goal is a greater distance than L (retrieved over connection 1107') from x. If so, no solution can be found by further expansion of the search space from x and the process is terminated, as depicted at 1117 but preferably repeated from 1102 with altered parameters including but not limited to shorter leg lengths, larger turn angles, maximum route length, and the like.

If the heap is not empty or if x is within distance L of the goal, the root removed from the min-heap at 1115 is added to the sparse A* search tree (SAST) 1150, as depicted at 1118. A test for compliance with the d-max constraint (1113b) can optionally be interposed at this point to prevent addition of a non-compliant point to the SAST 1150. A further test (1119) is now performed to determine if x is within distance L (retrieved over connection 1107') of the goal. If so, an end-game procedure 1120, the details of which are not important to the practice of the invention, is performed to terminate the process while generating the last segment of the route.

The route is then traced backward through the SAST to the start to determine the route which is then reported, as depicted at 1121. (The SAST will contain nodes for all locations searched and expanded even though pruning may have terminated expansion short of the goal. Therefore, backward searching from the goal is the most efficient procedure to determine the route since, in the forward direction, unless some other data such as a flag were generated and stored, complicating the process, the branch from a stored node which corresponded to the solution route could not be determined.) If x is not within L of the goal, at least two further segments of the route are possible and the process loops back to 1110.

In view of the foregoing, it is seen that the invention, particularly in a preferred form utilizing a min-heap and the novel sparse A* methodology is an accurate, efficient and robust procedure which advances the state of the art for optimization of route planning and other sequential and combinatorial processes. The ability to introduce arbitrary constraints in manners similar to the processing of constraints described above (or which will be evident to those skilled in the art in view of the above description) during the planning process makes the system and methodology of the invention useful and valuable for virtually all navigation or guidance systems because of the functionality and efficiency which it provides. Further, since the invention operates on data input in the form of an integer cost map, the invention is applicable to any other domain and higher dimensional environments which can be mapped in a similar fashion.

While the invention has been described in terms of a single preferred embodiment, those skilled in the art will recognize that the invention can be practiced with modification within the spirit and scope of the appended claims.

What is claimed is:

1. A method for planning a minimum cost route for a vehicle from a start node to a goal node by selecting successive next nodes in route path from a population of available nodes, said start node and said goal node defining a grid comprising cells, each next node being within one of a plurality of cells, and each cell having a cost associated therewith for the vehicle to traverse said cell, the route being constrained by a total cost from the start node to the goal node expressed in terms of vehicle physical constraints and/or mission specific constraints, the method comprising the steps of:

using a best-first search heuristic to provide costs to a node to be expanded to derive cost to the goal node via next nodes and evaluating all points and trajectories from which the node to be expanded may be reached, selecting a trajectory ending at a node to be expanded, defining sectors disposed around the trajectory at the node to be expanded in accordance with a first constraint, determining a lowest cost vector to the goal node via a next node which next node is separated by a length from said node to be expanded in each said sector, accumulating nodes corresponding to said lowest cost next nodes in a data structure for continually comparing cost values of the start to goal cost comparison, and selecting the minimum cost next node for each sector and inserting said node into the data structure and calculating a minimum cost node of the data structure paths including the lowest cost next nodes, and setting the one of the lowest cost next nodes in the minimum cost path as the next node to be expanded.

2. The method comprising the steps of repeating the method of claim 1 until the next node to be expanded is the goal node.

3. The method of claim 1 wherein the step of defining sectors comprises utilizing the constraint of maximum turning angle of the vehicle.

4. The method of claim 3 wherein the start node and the goal node define a three-dimensional grid and wherein each cell has a volume.

5. The method of claim 4 comprising the step of repeating the method of claim 1 until the next node to be expanded is the goal node.

* * * * *